United States Patent [19]
Wilcox

[11] 3,874,055
[45] Apr. 1, 1975

[54] METHOD OF MAKING VEHICLE WHEEL
[76] Inventor: Raymond J. Wilcox, 44 Via Casitas, San Luis Rey Downs, Calif. 92068
[22] Filed: Feb. 22, 1974
[21] Appl. No.: 446,199

[52] U.S. Cl. ........ 29/159.01, 29/159.03, 113/116 D, 301/13 R, 301/64 R, 301/104
[51] Int. Cl. .......................... B21h 1/02, B21k 1/32
[58] Field of Search ........ 29/159.01, 159 R, 159.03, 29/159.3; 301/10 R, 11 R, 12 R, 13 R, 104, 105 R, 135 M, 64 R; 113/116 D

[56] References Cited
UNITED STATES PATENTS

| | | | |
|---|---|---|---|
| 1,118,986 | 12/1914 | Williams | 29/159.01 |
| 1,159,322 | 11/1915 | Livingston | 29/159.01 X |
| 1,213,564 | 1/1917 | Williams | 113/116 D |
| 2,053,648 | 9/1936 | Arnold | 301/64 R X |
| 2,274,835 | 3/1942 | Koch | 113/116 D |
| 2,607,634 | 8/1952 | Faulkner | 301/13 R |
| 2,660,477 | 11/1953 | Sherman | 301/13 SM |

FOREIGN PATENTS OR APPLICATIONS
505,481   5/1939   Great Britain ................... 29/159.03

*Primary Examiner*—C. W. Lanham
*Assistant Examiner*—Victor A. DiPalma
*Attorney, Agent, or Firm*—Reising, Ethington & Perry

[57] ABSTRACT

A wheel manufactured from an elongated section of sheet steel is disclosed together with a method for its manufacture. Five rim retaining flanges are formed in the sheet steel. A rim retaining lip is formed along one edge of each of these five flanges. A reinforcing rib is formed adjacent each side of each rim retaining flange, making a total of ten reinforcing ribs. The sheet steel, formed with flanges and ribs, is coiled into a single closed loop. Ten circumferentially spaced radial vanes are formed in the loop. The five rim retaining flanges interconnect pairs of adjacent vanes at the outer diameter of the resulting wheel. At the inner diameter of the resulting wheel, five hub attachment flanges interconnect pairs of vanes. A threaded hub, fitted with bearing positioning shoulders, is welded and riveted to the five hub attachment flanges to complete the wheel.

8 Claims, 8 Drawing Figures

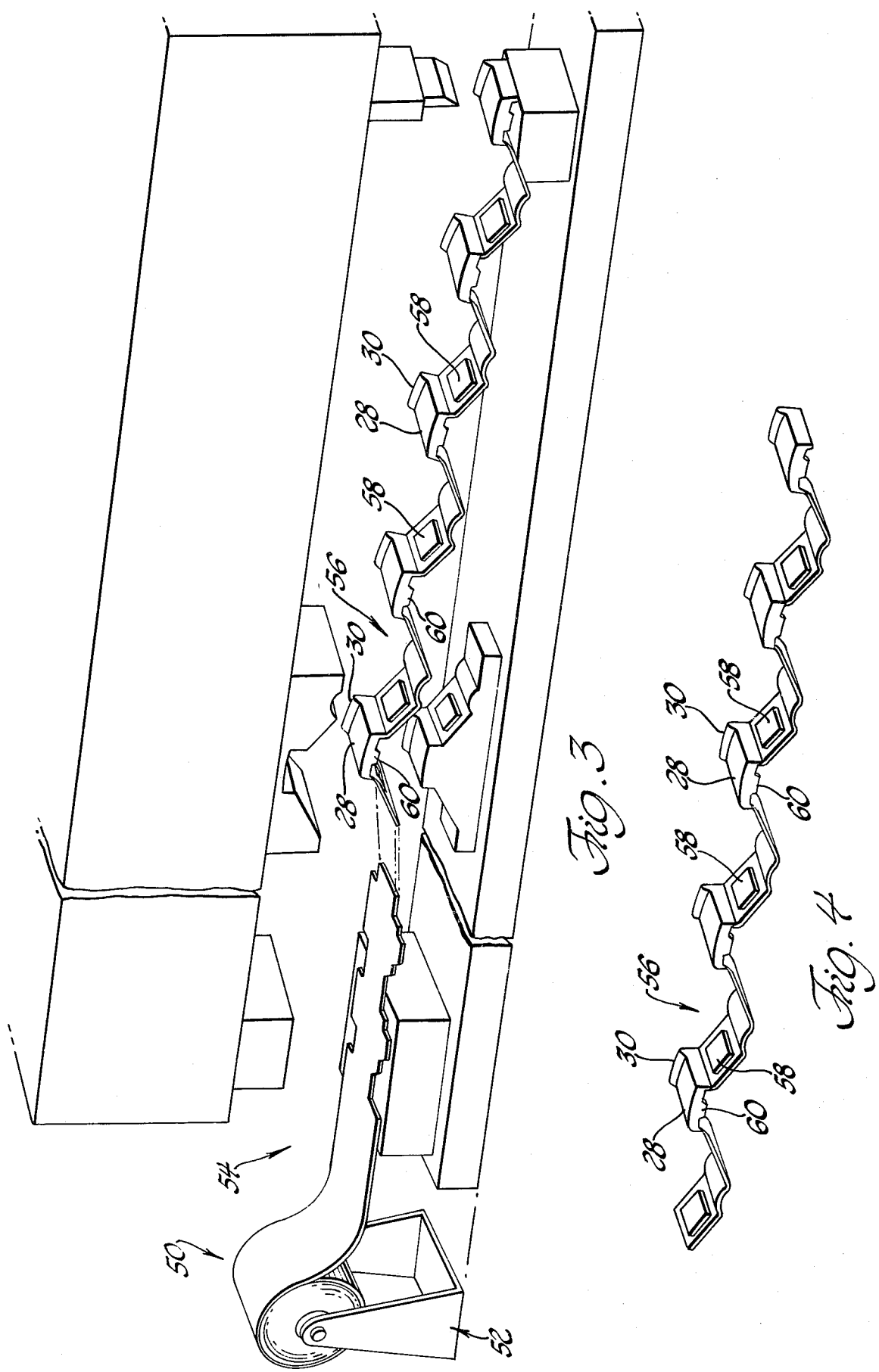

METHOD OF MAKING VEHICLE WHEEL

FIELD OF THE INVENTION

This invention relates to a vehicle wheel and a method for its manufacture.

DESCRIPTION OF THE PRIOR ART

Trucks and trailers are commonly fitted with pairs of rims and tires positioned side-by-side. A popular method for mounting such pairs of rims and tires on vehicles involves mounting each pair of rims and tires on a single wheel carried by a vehicle axle. This approach to mounting pairs of rims and tires has proven quite satisfactory. One illustration of the efficiency of this mounting concept is the relative ease with which tires can be changed inasmuch as both rims, together with both tires, can be removed upon the removal of one set of retaining bolts.

Commercially successful wheels of the type designed to carry two rims are typically manufactured by a casting process. Although pressed metal techniques have held out the prospect of reduced costs and simplified manufacture, they have not displaced castings to date.

A great number of pressed metal alternatives to cast wheels have been proposed over a period spanning several decades. The following patents are representative of the work done prior to the present invention: Pannecoucke, et al. Pat. No. 2,013,895; Sherman Pat. No. 2,653,057; Sherman Pat. No. 2,660,477; Schilberg Pat. No. 2,890,911; and Mitchell Pat. No. 3,394,966. Various specific designs, and various basic approaches, are disclosed in these patents.

Structural deficiencies in certain prior art pressed steel wheels have rendered those wheels commercially unsatisfactory. For those wheels, performance failures, including failures due to stress concentrations, have been unacceptable. Furthermore, in certain prior art pressed steel wheels, the complexity of the wheel design has prevented satisfactory mass manufacture. For various reasons, as noted above, prior to the present invention, no pressed steel wheel has gained widespread commercial acceptance.

SUMMARY OF THE INVENTION

The present invention is directed to a pressed steel wheel and the method of its manufacture. This wheel, in contradistinction to the prior art, is characterized by a structural design obviating performance failures, especially those resulting from stress concentrations. A further distinction of the present invention over the prior art resides in the simplicity of the design of the instant wheel, and the ease of its manufacture.

The wheel of the present invention is manufactured from an elongated section of sheet steel. Five spaced rim retaining flanges are formed in this section of sheet steel. A rim retaining lip is formed along one edge of each of these five rim retaining flanges. Ten reinforcing ribs are formed in the sheet steel, one reinforcing rib being formed on each side of each of the five rim retaining flanges. The sheet steel, formed with flanges and ribs, is coiled into a single closed loop. Ten circumferentially spaced radial vanes are formed in the loop. These vanes extend from the five rim retaining flanges, which define the outer diameter of the wheel, to five hub attachment flanges, which define the inner diameter of the wheel. A threaded hub, provided with bearing positioning shoulders, is welded and riveted to the hub attachment flanges to complete the manufacture of the wheel of this invention. The present invention resides in the design of the resultant wheel, and the manufacturing method used to produce it.

BRIEF DESCRIPTION OF THE DRAWINGS

The instant invention, together with further advantages and features thereof, can best be understood by reference to the following description of a preferred embodiment taken in combination with the accompanying drawings in which:

FIG. 3 is a schematic representation of a press operation included in the method of the present invention;

FIG. 4 illustrates an elongated section of sheet steel at an intermediate stage of the manufacture of the wheel of the present invention;

DESCRIPTION OF THE PREFERRED EMBODIMENT

Figure 1:
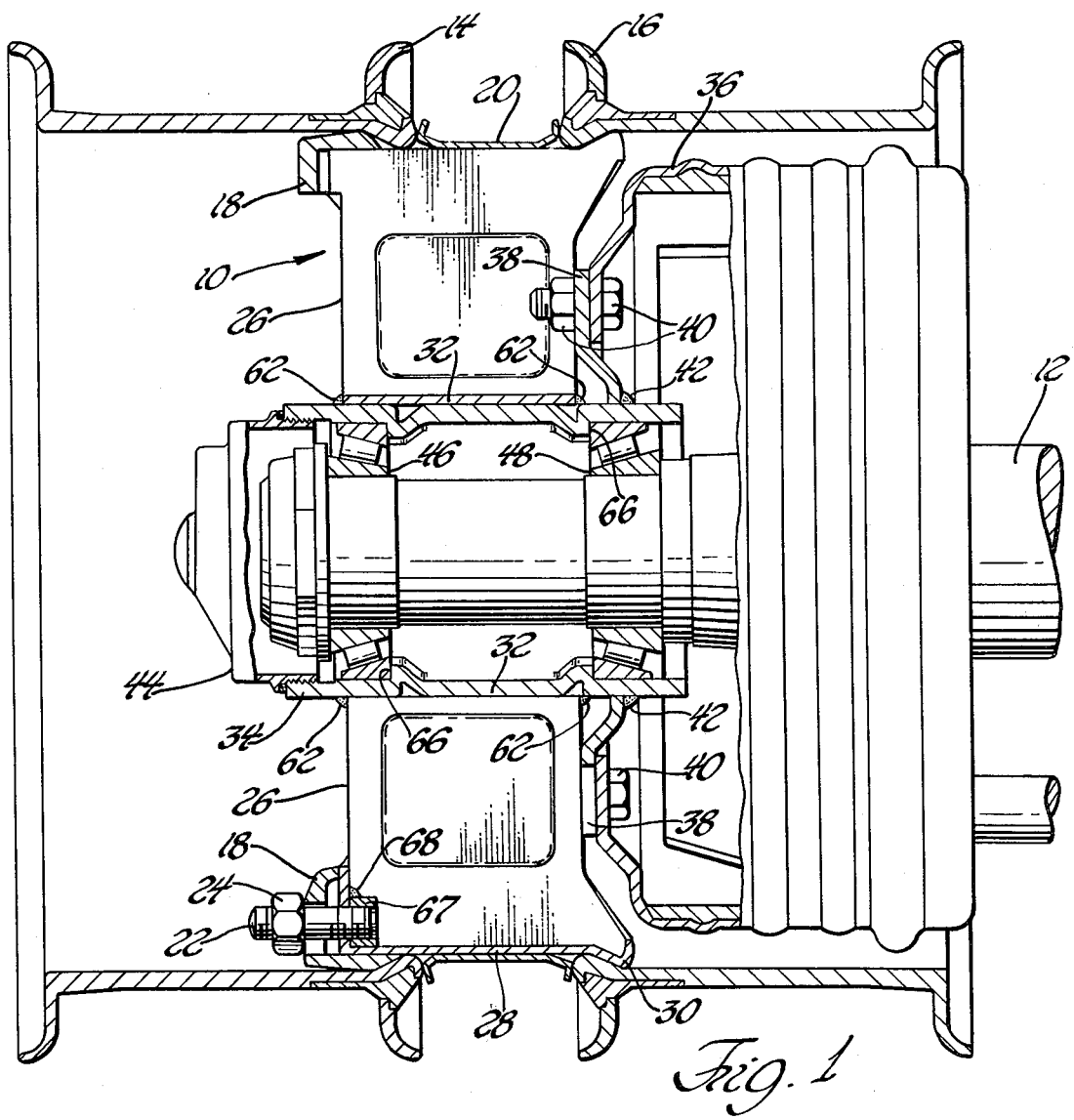
FIG. 1 is a partial sectional view of a vehicle axle carrying a wheel manufactured in accordance with the present invention.

Reference should now be made to the drawings and more particularly to FIg. 1 wherein the wheel of the present invention generally designated 10 is illustrated. The wheel 10 is carried by a vehicle axle 12. First and second conventional rims 14 and 16 are secured to and carried by the wheel 10. In normal use, each of the rims 14 and 16 is fitted with a tire (not illustrated). A retaining ring 18, a spacer ring 20, mounting studs 22, and mounting nuts 24 are used to mount the rims 14 and 16 on the wheel 10 in a conventional manner. As shown in FIG. 1, but best illustrated in FIGS. 2 through 8, the wheel 10 includes a plurality of circumferentially spaced radially extending vanes 26, a plurality of rim retaining flanges 28, a plurality of rim retaining lips 30, a plurality of hub attachment flanges 32, and a hub 34, all of which are described more completely hereinafter. A brake drum 36 is rigidly coupled with the hub 34 through a drum connecting member 38 and a plurality of fasteners, illustrated as bolts and nuts 40. The drum connecting member 38 is welded to the hub 34 at the weld bead 42. A hub cap 44 is threaded into the hub 34 which houses front and rear bearings 46 and 48 supporting the wheel 10 on the axle 12. The brake drum 36 and brake mechanism, and the bearings 46 and 48 and associated members, are not described herein in detail as they form no part of the present invention.

Reference should now be made to FIGS 3 through 8 which are referred to in the course of the following description of the manufacturing method of the present invention. FIG. 3 shows a coil of sheet steel generally disignated 50 supplied from a feeding mechanism generally designated 52 into a press, illustrated schematically and generally designated 54. The specification for the steel used in the manufacture of a particular wheel necessarily depends upon the operating demands on that wheel. Inasmuch as the present invention is directed to a wheel and the method of its manufacture without reference to the selection of steel for its fabrication, no detailed discussion of the applicable conventional selection criteria for selecting steel is pursued herein.

At the machine 54 the steel from coil 50 is stamped and formed. In the preferred embodiment a multistation press is used, and the wheel is formed therein to the intermediate stage illustrated in FIG. 4. It is understood and appreciated that various permutations and combinations of machining operations can be organized to practice the method of the present invention. Multi-station presses, or several presses, or combinations of multi-station presses and several presses can be used in the instant method. Furthermore, the sequence of steps can be arranged in a variety of sequences within the method disclosed herein. In the preferred embodiment, however, at the end of the first series of processing steps illustrated schematically in FIG. 3, the vehicle wheel will have the form shown in FIG. 4 comprising a single elongated section of sheet steel generally designated 56. A plurality of spaced rim retaining flanges 28, five in the preferred embodiment, are formed in the sheet steel. A rim retaining lip 30 is formed along one edge of each flange 28. A plurality of reinforcing ribs 58, ten in the preferred embodiment, are formed in the sheet steel; several reinforcing ribs could be substituted for each of the ribs 58, or reinforcement could be achieved in the subject wheel by alternative, know reinforcement means. A respective reinforcing rib 58 is formed adjacent each side of each flange 28. Tabs 60, disposed within and at the ends of the flanges 28 are formed integrally with the flanges 28 during the series of forming operations performed on the sheet steel 56. Preferably the tabs 60 are integral with the respective flanges 28 at all edges where they abut. It is understood and appreciated, however, that the tab 60 could be formed otherwise during the manufacture of the wheel 10.

Figure 2:
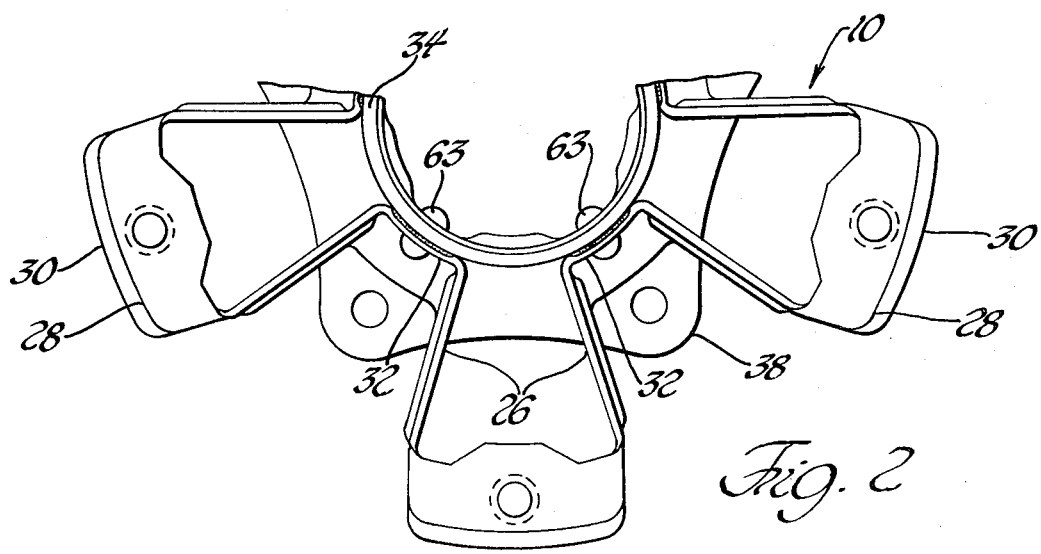
FIG. 2 is a partial sectional view of the wheel shown in FIG. 1.
Figure 5:
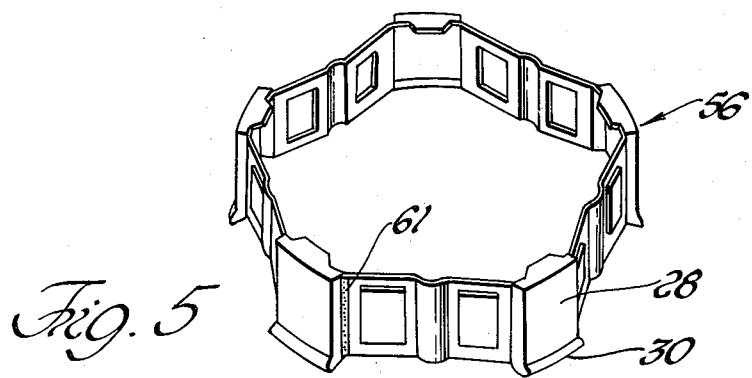
FIG. 5 depicts the wheel of the present invention at an intermediate stage in its manufacture.
Figure 6:
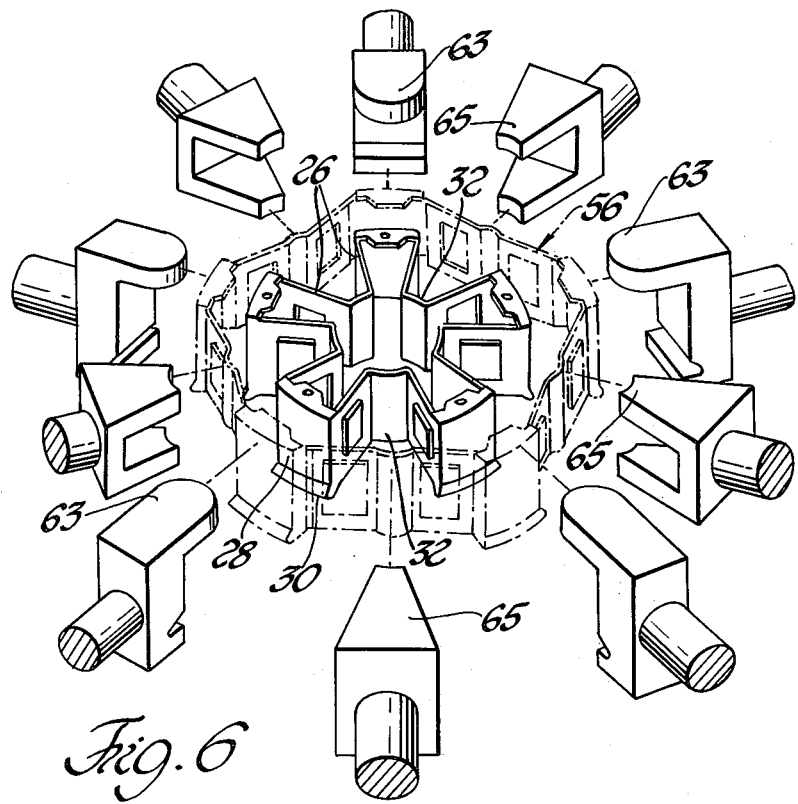
FIG. 6 illustrates the wheel of the present invention after the vanes of the wheel are formed as radial elements.
Figure 7:
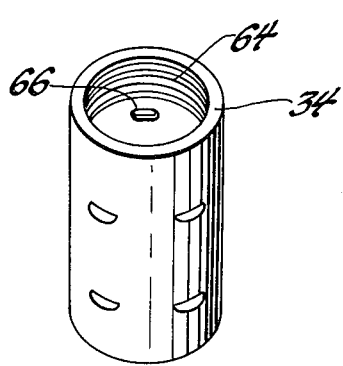
FIG. 7 depicts the hub incorporated in the wheel of the present invention.
Figure 8:
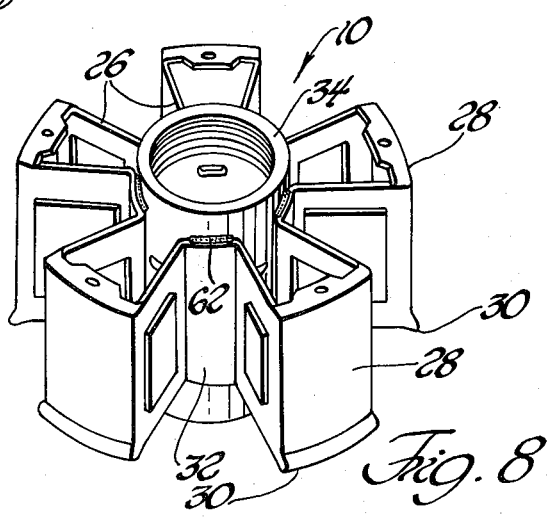
FIG. 8 shows the wheel of the present invention.

The elongated section of sheet steel formed as illustrated in FIG. 4 is coiled into a single closed loop as illustrated in FIG. 5. The two ends of this loop are butted and joined together in the preferred embodiment, preferably by welding at weld bead 61. As alluded to above, it is understood and appreciated that various of the forming operations described herein as complete prior to coiling could be performed after coiling and still be within the method of the present invention. Forming dies 63 and 65 are brought into engagement with the coiled wheel as illustrated in FIG. 6 in phantom line. These forming dies deform the coil of FIG. 5 at predetermined circumferentially spaced points to produce the radial vanes 26 and the hub attachment flanges 32. The hub, preferably prepared as illustrated in FIG. 7, is attached to the wheel at the hub attachment flanges 32. Preferably the hub is welded to the hub attachment flanges by weld beads 62, and riveted by rivets 63 as best shown in FIG. 2. Alternative welds could be used, as well as other rivets, bolts, ets., in the attachment of the hub 34 to the flanges 32. As shown in FIG. 7, the hub is provided with threads 64, and a plurality of formed bearing positioning shoulders 66.

The tabs dependent from the rim retaining flanges 28 at the ends of the flanges opposite the lips 30 are provided with threaded attachment means 67 in the preferred embodiment. As shown in FIG. 1, backing plates (alternatively, nuts or other elements could be used) are secured, preferably by welding, at beads 68, to the interior side of the tabs. The backing plates are then drilled and threaded to receive the rim retaining studs 22.

Although the foregoing description has proceeded in terms of a specific preferred embodiment, it should be understood and appreciated that various modifications and revisions could be engrafted thereon within the spirit and scope of the appended claims.

I claim:

1. A method for fabricating vehicle wheels comprising:
    forming a plurality of spaced rim retaining flanges in an elongated section of sheet steel;
    coiling said elongated section of sheet steel into a single closed loop;
    deforming said single closed loop at predetermined circumferentially spaced points to produce a plurality of circumferentially spaced radial vanes extending from an inner diameter to said rim retaining flanges at an outer diameter; and
    attaching said deformed single closed loop to a hub fitted into said inner diameter.

2. A method as in claim 1 including forming a rim retaining lip along one edge of each of said spaced rim retaining flanges.

3. A method as in claim 2 including forming reinforcing ribs in said vanes.

4. A method as in claim 3 including providing tabs dependent from said rim retaining flanges, said tabs being disposed within and at the ends of said rim retaining flanges.

5. A method as in claim 4 including providing said tabs with fastening means.

6. A method as in claim 5 including providing said hub with bearing positioning shoulders therein.

7. A method as in claim 6 including threading said hub.

8. A method as in claim 7 including welding said deformed loop to said hub.

* * * * *